United States Patent
Subhaschandra Banakar et al.

(10) Patent No.: US 11,449,730 B2
(45) Date of Patent: Sep. 20, 2022

(54) METHOD AND SYSTEM FOR VERIFYING CLASSIFICATION PERFORMED BY AN ARTIFICIAL NEURAL NETWORK

(71) Applicant: Wipro Limited, Bangalore (IN)

(72) Inventors: Sneha Subhaschandra Banakar, Bengaluru (IN); Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 889 days.

(21) Appl. No.: 16/276,646

(22) Filed: Feb. 15, 2019

(65) Prior Publication Data

US 2020/0202197 A1 Jun. 25, 2020

(30) Foreign Application Priority Data

Dec. 24, 2018 (IN) .............................. 201841048970

(51) Int. Cl.
*G06N 3/04* (2006.01)
*G06N 3/08* (2006.01)
*G06K 9/62* (2022.01)

(52) U.S. Cl.
CPC ......... *G06N 3/0445* (2013.01); *G06K 9/6262* (2013.01); *G06N 3/08* (2013.01)

(58) Field of Classification Search
USPC ............................................. 706/25, 232, 21
See application file for complete search history.

(56) References Cited

U.S. PATENT DOCUMENTS

| | | | |
|---|---|---|---|
| 2017/0161772 A1* | 6/2017 | Xu ...................... | G06F 16/2455 |
| 2018/0204120 A1* | 7/2018 | Rei .......................... | G06N 3/04 |
| 2019/0180174 A1* | 6/2019 | Koswatta ............... | H03K 19/20 |

* cited by examiner

*Primary Examiner* — Kiet M Doan
(74) *Attorney, Agent, or Firm* — Finnegan, Henderson, Farabow, Garrett & Dunner, LLP (57) ABSTRACT

This disclosure relates to method and system for verifying a positive classification performed by an artificial neural network (ANN) in a given class. The method includes generating a weight matrix comprising a weight of each neural node in a given layer; determining a contribution factor of a given neural node in the given layer with respect to an output of the ANN for the given class based on a known input vector to the given layer and a modified weight matrix; and generating a dominance matrix based on the contribution factor of each neural node in the given layer. The method further includes determining a rank of each neural node based on the corresponding dominance factor; and verifying the positive classification performed by the ANN in the given class for a test input vector based on the rank of each neural node in each layer of the ANN.

18 Claims, 4 Drawing Sheets

METHOD AND SYSTEM FOR VERIFYING CLASSIFICATION PERFORMED BY AN ARTIFICIAL NEURAL NETWORK

TECHNICAL FIELD

This disclosure relates generally to artificial neural network (ANN), and more particularly to method and system for verifying classification performed by an ANN.

BACKGROUND

Artificial neural network (ANN) may be employed in a wide variety of applications, including, but not limited to, computer vision, image recognition, natural language processing, speech recognition, and decision making. An ANN may learn to perform a task by considering examples, generally without being programmed with any task-specific rules. For example, in image recognition, the ANN may learn to identify specific objects in images by analyzing example images that may or may not have such specific objects. The ANN is based on a collection of connected nodes called 'neural nodes' aggregated into one or more layers. The connections between 'neural nodes' are called 'edges'. Each of the 'neural nodes' and 'edges' may have a 'weight' that may adjust as learning proceeds.

The ANN often achieve high classification accuracy but has few limitations including, but not limited to, long training time requirement, difficulty in determining efficient network structure, difficulty in explaining its decision (i.e., classification). The inability to clearly understand and explain the reason for a decision taken by the ANN is one of the main differences between artificial and human intelligence. As stated above, the ANN may usually provide an answer based on the data they have learned but not a reason for how it arrived to that answer. Thus, in many ANN based applications, it is difficult to find how the ANN made a specific decision. This, limitation pose challenges in improving the decision making of the ANN or altering the decision making of the ANN so as to minimize false positives. This limitation also limits our ability to learn from ANN when they make a decision that wouldn't occur to us. It may, therefore, be desirable to understand and explain how an ANN came to a particular decision, so as to further improve the decision making of the ANN or to further expand our understanding.

SUMMARY

In one embodiment, a method for verifying a positive classification performed by an artificial neural network (ANN) in a given class from among a plurality of classes is disclosed. In one example, the method may include generating, for each layer of the ANN, a weight matrix comprising a weight of each neural node in a given layer. The method may further include determining, for each neural node in the given layer, a contribution factor of a given neural node in the given layer with respect to an output of the ANN for the given class based on a known input vector to the given layer and a modified weight matrix. The modified weight matrix may be derived from the weight matrix by replacing weight of the given neural node in the given layer with a predefined weight. The method may further include generating, for the given layer, a dominance matrix based on the contribution factor of each neural node in the given layer. The dominance matrix may be used to obtain a dominance factor of each neural node in the given layer. The method may further include determining, for the given layer, a rank of each neural node based on the corresponding dominance factor. The method may further include verifying the positive classification performed by the ANN in the given class for a test input vector based on the rank of each neural node in each layer of the ANN.

In one embodiment, a system for of verifying a positive classification performed by an ANN in a given class from among a plurality of classes is disclosed. In one example, the system may include an ANN validation device, which may include at least one processor and a memory communicatively coupled to the at least one processor. The memory may store processor-executable instructions, which, on execution, may cause the processor to generate, for each layer of the ANN, a weight matrix comprising a weight of each neural node in a given layer. The processor-executable instructions, on execution, may further cause the processor to determine, for each neural node in the given layer, a contribution factor of a given neural node in the given layer with respect to an output of the ANN for the given class based on a known input vector to the given layer and a modified weight matrix. The modified weight matrix may be derived from the weight matrix by replacing weight of the given neural node in the given layer with a predefined weight. The processor-executable instructions, on execution, may further cause the processor to generate, for the given layer, a dominance matrix based on the contribution factor of each neural node in the given layer. The dominance matrix may be used to obtain a dominance factor of each neural node in the given layer. The processor-executable instructions, on execution, may further cause the processor to determine, for the given layer, a rank of each neural node based on the corresponding dominance factor. The processor-executable instructions, on execution, may further cause the processor to verify the positive classification performed by the ANN in the given class for a test input vector based on the rank of each neural node in each layer of the ANN.

In one embodiment, a non-transitory computer-readable medium storing computer-executable instructions for verifying a positive classification performed by an ANN in a given class from among a plurality of classes is disclosed. In one example, the stored instructions, when executed by a processor, may cause the processor to perform operations including generating, for each layer of the ANN, a weight matrix comprising a weight of each neural node in a given layer. The operations may further include determining, for each neural node in the given layer, a contribution factor of a given neural node in the given layer with respect to an output of the ANN for the given class based on a known input vector to the given layer and a modified weight matrix. The modified weight matrix may be derived from the weight matrix by replacing weight of the given neural node in the given layer with a predefined weight. The operations may further include generating, for the given layer, a dominance matrix based on the contribution factor of each neural node in the given layer. The dominance matrix may be used to obtain a dominance factor of each neural node in the given layer. The operations may further include determining, for the given layer, a rank of each neural node based on the corresponding dominance factor. The operations may further include verifying the positive classification performed by the ANN in the given class for a test input vector based on the rank of each neural node in each layer of the ANN.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
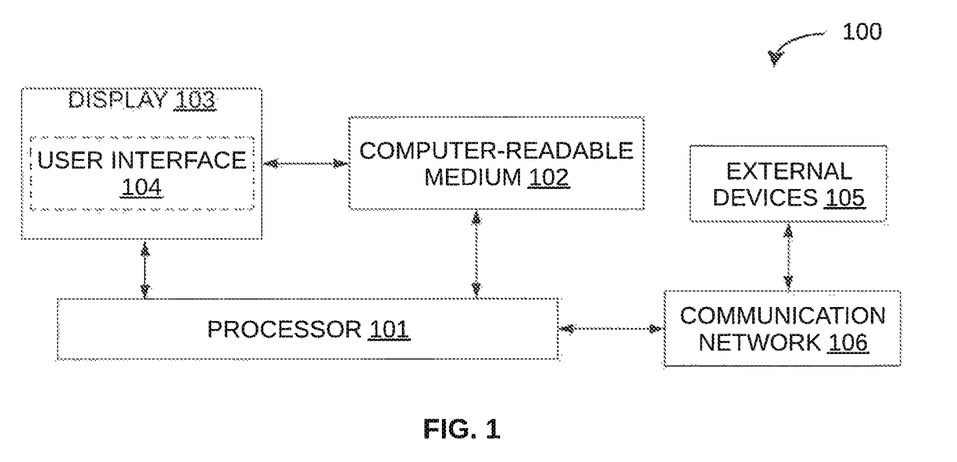
FIG. 1 is a block diagram of an exemplary system for verifying classification performed by an artificial neural network (ANN), in accordance with some embodiments of the present disclosure.

Referring now to FIG. 1, an exemplary system 100 for verifying classification performed by an artificial neural network (ANN) is illustrated, in accordance with some embodiments of the present disclosure. As will be appreciated, the system 100 may implement an ANN for a target application. Further, the system 100 may implement an ANN validation engine, in accordance with some embodiments of the present disclosure. The ANN validation engine may analyze and verify the decisions made by the ANN (i.e., the classifications performed by the ANN) so as to minimize false positives and to improve performance. In particular, the system 100 may include an ANN validation device (for example, server, desktop, laptop, notebook, netbook, tablet, smartphone, mobile phone, or any other computing device) that may implement the ANN validation engine. It should be noted that, in some embodiments, the ANN validation engine may help in understanding the reason for the decisions taken by the ANN and, therefore, improve its performance by reducing the number of false positives in the outcome.

As will be described in greater detail in conjunction with FIGS. 2-4, the ANN validation engine may generate, for each layer of the ANN, a weight matrix comprising a weight of each neural node in a given layer. The ANN validation engine may then determine, for each neural node in the given layer, a contribution factor of a given neural node in the given layer with respect to an output of the ANN for the given class based on a known input vector to the given layer and a modified weight matrix. It should be noted that the modified weight matrix may be derived from the weight matrix by replacing weight of the given neural node in the given layer with a predefined weight. The ANN validation engine may then generate, for the given layer, a dominance matrix based on the contribution factor of each neural node in the given layer. It should be noted that the dominance matrix may be used to obtain a dominance factor of each neural node in the given layer. The ANN validation engine may then determine, for the given layer, a rank of each neural node based on the corresponding dominance factor. The ANN validation engine may then verify the positive classification performed by the ANN in the given class for a test input vector based on the rank of each neural node in each layer of the ANN.

The system 100 may include one or more processors 101, a computer-readable medium (for example, a memory) 102, and a display 103. The computer-readable storage medium 102 may store instructions that, when executed by the one or more processors 101, cause the one or more processors 101 to verify classification performed by the ANN, in accordance with aspects of the present disclosure. The computer-readable storage medium 102 may also store various data (for example, weight matrix for each layer of the ANN, predefined weight for generating modified weight matrix, modified weight matrix for each neural node of each layer of the ANN, known input vector, contribution factor of each neural node of each layer of the ANN for each class, the dominance matrix for each layer for each class, dominance factor of each neural node of each layer of the ANN for each class, rank of each neural node in each layer for each class, test input vector, and the like) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
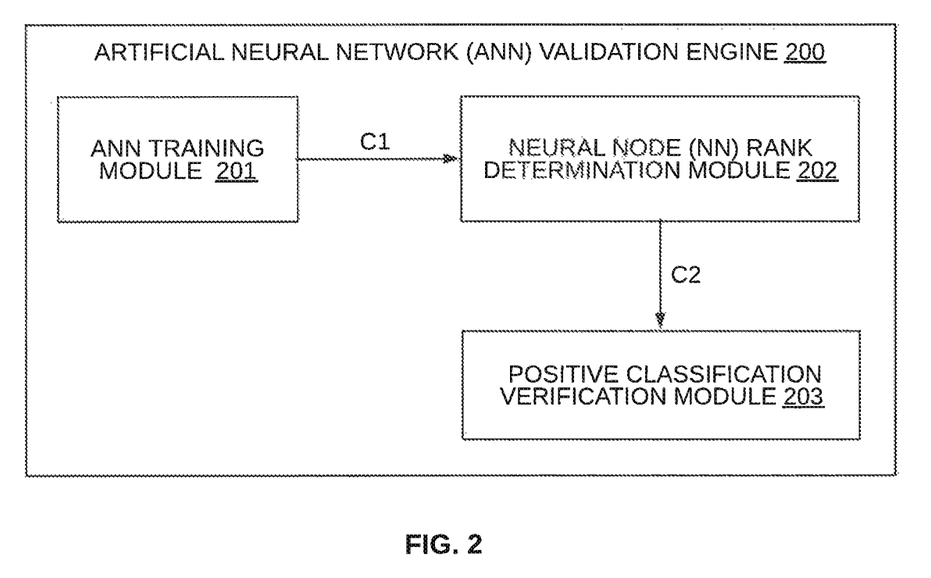
FIG. 2 is a functional block diagram of an ANN validation engine, in accordance with some embodiments of the present disclosure.

Referring now to FIG. 2, a functional block diagram of an ANN validation engine 200, implemented by the system 100 of FIG. 1, is illustrated, in accordance with some embodiments of the present disclosure. The ANN validation engine 200 may include various modules that perform various functions so as to verify a positive classification performed by the ANN in a given class and to minimize false positives. In some embodiments, the ANN validation engine 200 may include an ANN training module 201, a neural node (NN) rank determination module 202, and a positive classification verification module 203. As will be appreciated by those skilled in the art, all such aforementioned modules 201-203 may be represented as a single module or a combination of different modules. Moreover, as will be appreciated by those skilled in the art, each of the modules 201-203 may reside, in whole or in parts, on one device or multiple devices in communication with each other.

The ANN training module 201 may build and train an ANN with a training dataset for a target application. The target application may include, but may not be limited to, computer vision, image recognition, natural language processing, speech recognition, and decision making. The ANN training module 201 may then generate a weight matrix of all the neural nodes in a given layer, for each layer of the ANN. Thus, once the ANN has been trained for the training dataset, the weight matrix may include values of all the neural nodes in the given layer for each layer of the ANN.

The NN rank determination module 202 may receive the weight matrix of for each layer of the ANN from the ANN training module 201 via a C1 interface using standard wired or wireless data transfer protocols. The NN rank determination module 202 may then determine, for each class and for each neural node in each layer, a contribution factor of a given neural node in a given layer with respect to an output of the ANN for a given class. It should be noted that each neural node may have a certain amount of contribution in deciding the prediction output for a given input data. The identification of the amount of contribution of the neural nodes to the prediction output may help in deciding the more dominant ones for a given layer. Further, the NN rank determination module 202 may generate, for each layer of the ANN, a dominance matrix of a given layer based on the contribution factor of each neural node in the given layer. The NN rank determination module 202 may then employ the dominance matrix of the given layer to determine a dominance factor of each of the neural nodes in the given layer. The NN rank determination module 202 may then determine, for each layer of the ANN, a rank of the neural nodes in the given layer based on the corresponding dominance factor.

The positive classification verification module 203 may receive, for each layer of the ANN, a rank of each neural node in the given layer from the NN rank determination module 202 via a C2 interface using standard wired or wireless data transfer protocols. The positive classification verification module 203 may then verify a positive classification performed by the ANN in a given class for the test dataset based on the rank of each neural node in each layer of the ANN for the given class derived using training dataset. In other words, for each of the positive results in the test input for each class, the positive classification verification module 203 may verify if the same ranking order of the neural nodes has influenced the decision of the network. If the neural nodes that are contributing to the positive result are different from the determined order, then the validation engine 200 may predict that it may be a false positive. As will be appreciated, the verification of the positive classification may result in reduction in a false positives of the ANN, which, in turn, may result in improvement in the accuracy of the ANN.

It should be noted that the ANN validation engine 200 may be implemented in programmable hardware devices such as programmable gate arrays, programmable array logic, programmable logic devices, and so forth. Alternatively, the ANN validation engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for verification of the classification performed by the ANN. For example, the exemplary system 100 and the associated ANN validation engine 200 may verify a positive classification performed by the ANN in a given class by the processes discussed herein. In particular, as will be appreciated by those of ordinary skill in the art, control logic and/or automated routines for performing the techniques and steps described herein may be implemented by the system 100 and the ANN validation engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
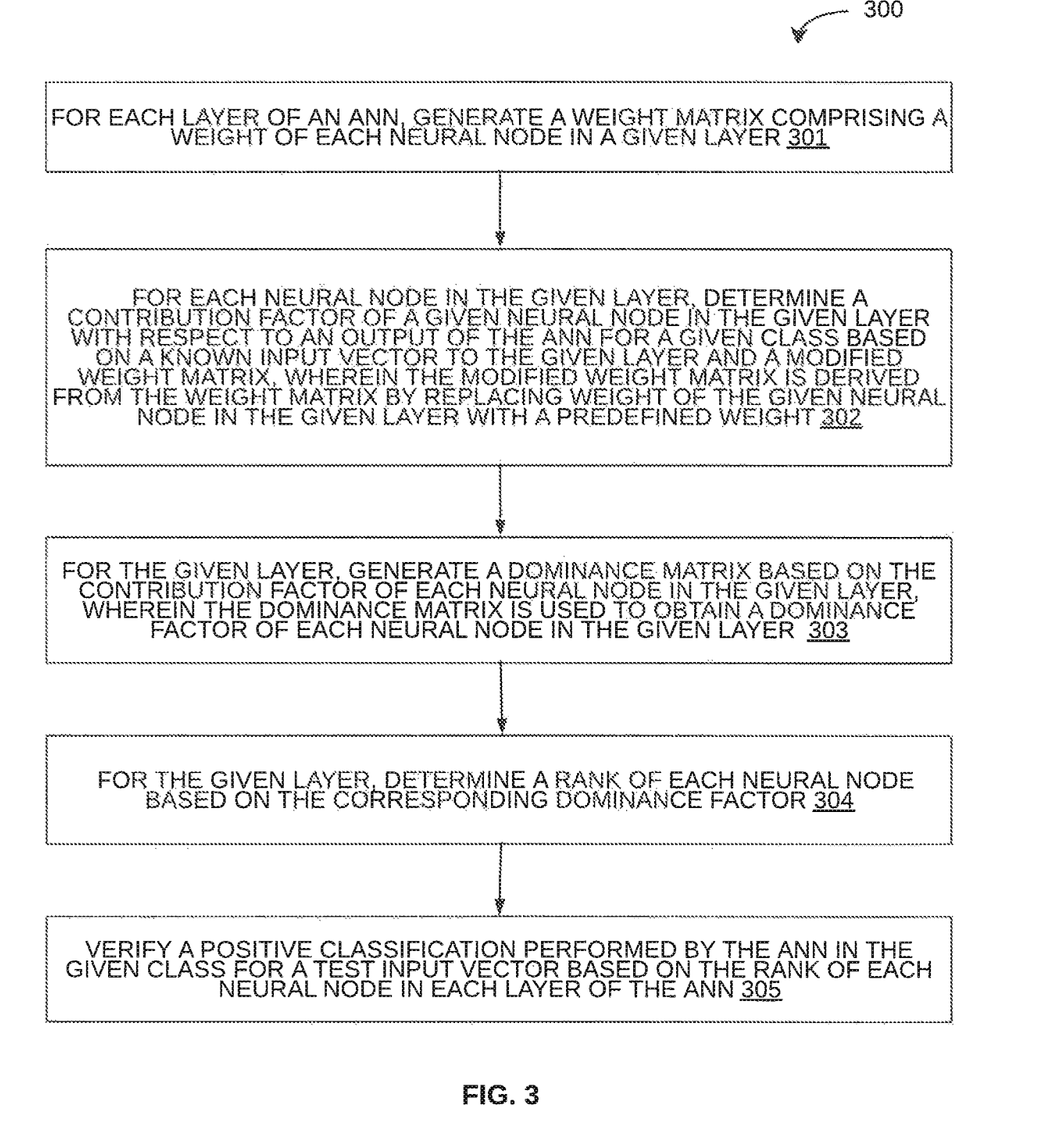
FIG. 3 is a flow diagram of an exemplary process for verifying a positive classification performed by an ANN in a given class, in accordance with some embodiments of the present disclosure.

For example, referring now to FIG. 3, exemplary control logic 300 for verifying a positive classification performed by an ANN in a given class from among a plurality of classes via a system, such as the system 100, is depicted via a flowchart, in accordance with some embodiments of the present disclosure. As illustrated in the flowchart, the control logic 300 may include the steps of generating, for each layer of the ANN, a weight matrix including a weight of each neural node in a given layer at step 301; determining, for each neural node in the given layer, a contribution factor of a given neural node in the given layer with respect to an output of the ANN for the given class based on a known input vector to the given layer and a modified weight matrix at step 302; and generating, for the given layer, a dominance matrix based on the contribution factor of each neural node in the given layer step 303. It should be noted that the modified weight matrix may be derived from the weight matrix by replacing weight of the given neural node in the given layer with a predefined weight. Further, it should be noted that the dominance matrix may be used to obtain a dominance factor of each neural node in the given layer. The control logic 300 may further include the steps of determining, for a given layer, a rank of each neural node based on the corresponding dominance factor at step 304; and verifying the positive classification performed by the ANN in the given class for the test input vector based on the rank of each neural node in each layer of the ANN at step 305.

In some embodiments, generating the weight matrix at step 301 may include the step of building and training the ANN for a target application. Additionally, in some embodiments, determining the contribution factor of the given neural node in the given layer at step 302 may include the steps of determining weight adjustment for each remaining neural node in the given layer with the modified weight matrix and the known input vector in order to arrive at the output of the ANN with the original weight matrix and the known input vector, and determining the contribution factor based on the weight adjustment for each remaining neural node in the given layer. It should be noted that, in some embodiments, the predefined weight in the modified weight matrix is about zero.

Further, in some embodiments, the dominance factor of each neural node in the given layer at step 303 may be obtained by adding value of each element in corresponding row of a modified dominance matrix. It should be noted that the modified dominance matrix may be derived from the dominance matri. Moreover, in some embodiments, verifying the positive classification at step 305 may include the steps of determining a dominance factor and a rank of each neural node in each layer based on the test input vector; and comparing, for each layer, the rank of each neural node in a given layer for the test input vector with the corresponding rank of each neural node for the known input vector. It should be noted that, in some embodiments, verifying the positive classification at step 305 may be further based on the dominance factor of each neural node in each layer. In such embodiments, verifying the positive classification at step 305 may additionally include comparing, for each layer, the dominance factor of each neural node in a given layer for the test input vector with the corresponding dominance factor of each neural node for the known input vector.

Figure 4:
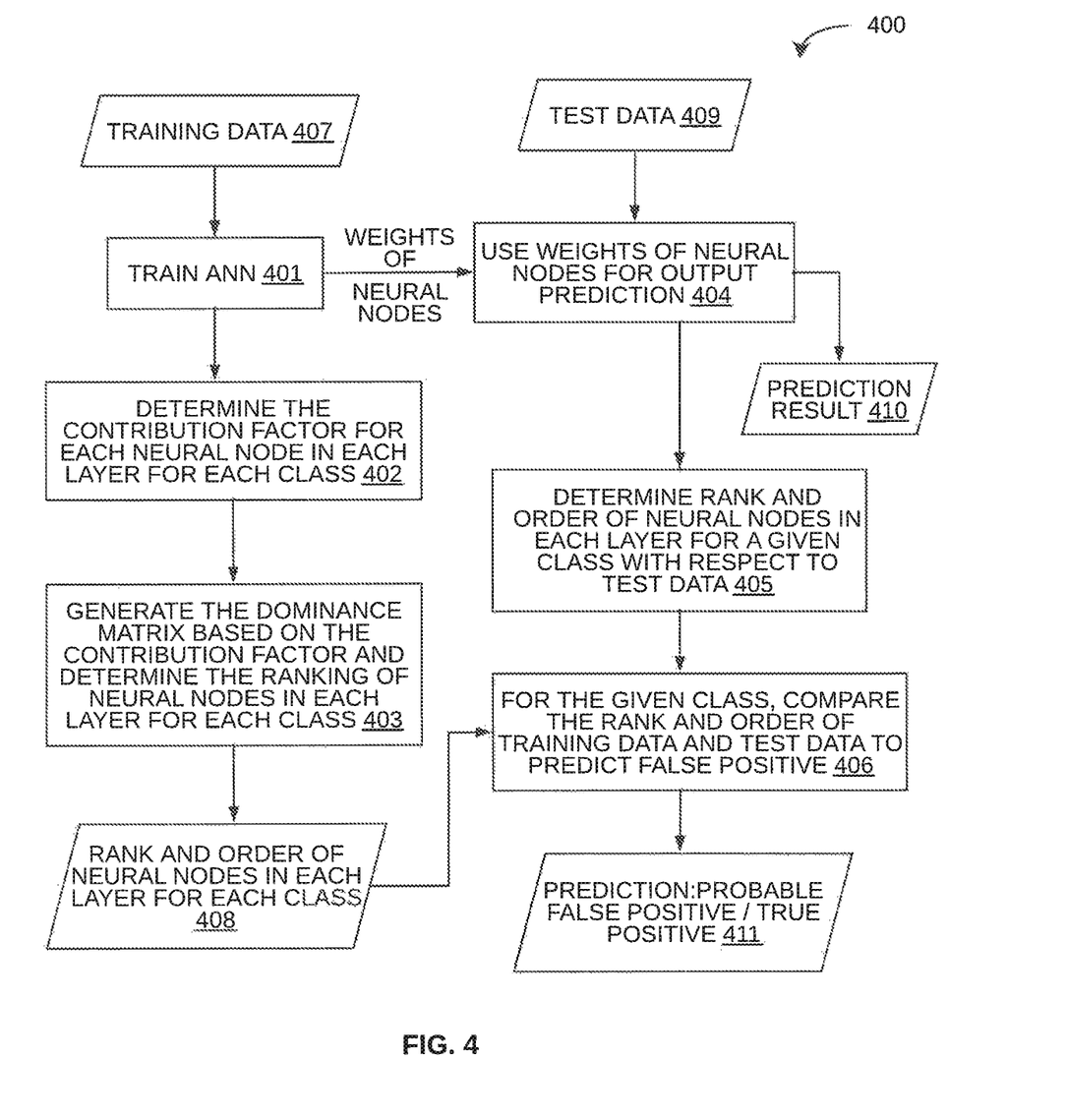
FIG. 4 is a flow diagram of a detailed exemplary process for verifying a positive classification performed by an ANN in a given class, in accordance with some embodiments of the present disclosure.

Referring now to FIG. 4, exemplary control logic 400 for verifying a positive classification performed by an ANN in a given class from among a plurality of classes is depicted in greater detail via a flowchart, in accordance with some embodiments of the present disclosure. As illustrated in the flowchart, at step 401, the control logic 400 may build and train the ANN for a target application using training data 407 via the ANN training module 201. Thus, a weight matrix may be generated for each layer of the ANN. The weight matrix may include a weight of each neural node in a given layer, for each layer of the ANN.

At step 402, the control logic 400 may determine a contribution factor for each neural node in each layer of the ANN and for each class via the NN rank determination module 202. As stated above, each of the neural nodes may have different contribution to a final output of the ANN. For example, in any given layer, some of the neural nodes may not contribute to a classification performed by the ANN, while other neural nodes may contribute in different ranges to the classification. The control logic 400 may, therefore, determine the contribution factor of a given neural node in the given layer with respect to an output of the ANN for a given class using a known input vector from the training dataset 407. In some embodiments, to determine the contribution factor of a given neural node in a given layer for a given class, the NN rank determination module 202 may set the weight of the given neural node in the weight matrix for the given layer to a predefined weight (e.g., about zero so as to make the neural node not contribute to the output) in order to measure its effect on the weights of remaining neural nodes in the given layer. As will be appreciated, setting or removal of weight of a given neural node in a given layer may result in a modified weight matrix for the given neural node in the given layer. Further, as will be appreciated, setting or removal of weight of one neural node may lead to weight adjustments in remaining neural nodes in the given layer so as to balance and arrive at the required result (i.e., output of the ANN). The difference in the weight adjustments of remaining neural nodes upon setting the weight of each neural node may be combined to determine the contribution factor of each of the neural nodes.

At step 403, the control logic 400 may generate the dominance matrix for each layer and for each class via the NN rank determination module 202. The dominance matrix for a given layer and for a given class may be based on the contribution factor of neural nodes for the given layer and for the given class. At step 403, the control logic 400 may further determine the ranking of each neural node in each layer and for each class via the NN rank determination module 202. The ranking of neural nodes in a given layer and for a given class may be based on the dominance matrix for the given layer and for the given class. In particular, the dominance matrix for a given layer and for a given class may be employed to obtain a dominance factor of each neural node in the given layer for the given class. As stated above, the dominance factor of each neural node is obtained by adding value of each element in corresponding row of a modified dominance matrix (that is derived from the dominance matrix). As will be appreciated, the dominance factor of the neural nodes may help the ANN validation engine 200 to understand more dominant neural nodes in a given layer for a given class (i.e., neural nodes in the layer that have more influence on the decision). Thus, the dominance factor of a given neural node in the given layer for the given class may be used to determine a rank and order of the given neural node in the given layer for the given class. In this way, the NN rank determination module 202 may determine rank and order of neural nodes in each layer and for each class 408.

At step 404, the control logic 400 may use the weights of the neural nodes (from step 401) to predict output for the test dataset 409. As will be appreciated, the prediction result 410 may be a positive classification in a particular class for a given test input vector. It should be noted that the particular class may be from a number of classes that may be identified by the ANN. Further, it should be noted that the number of classes may be based on the requirement of the target application for which the ANN is built and trained.

The control logic 400 may then verify the positive classification in the particular class, via the positive classification verification module 203, using rank and order of neural nodes in each layer and for each class 408. In other words, the control logic 400 may determine if the positive classification in the particular class is a false positive or not. To this end, at step 405, the control logic 400 may determine the rank and order of the neural nodes in each layer of the ANN with respect to the given test input vector and the particular class. As will be appreciated, the rank and order of the neural nodes in each layer of the ANN with respect to the test input vector is determined in a similar fashion as the rank and order of the neural nodes in each layer of the ANN 408 with respect to the known input vector. Further, at step 406, the control logic 400 may compare whether the rank and order of the neural nodes obtained with respect to the test input vector in the particular class is similar to (i.e., about same) as the rank and order of the neural nodes obtained with respect to the known input vector in that particular class. The comparison may help in determining if the positive classification in the particular class is a false positive or not. If the rank and order of the neural nodes with respect to the test input vector in the particular class is similar to the rank and order of the neural nodes with respect to the known input vector in that particular class, then the positive classification may be determined to be a probable correct classification (i.e., true positive) 411. However, if the rank and order of the neural nodes with respect to the test input vector in the particular class is not similar to that with respect to the known input vector, then the positive classification may be determined to be a probable misclassification (i.e., probable false positive) 411. It should be noted that the same procedure may be extrapolated for each layer of the ANN. In this way, for each of the predictions, the control logic 400 may verify if the positive classification performed by the ANN is proper or not. As will be appreciated, such verification of classification performed by the ANN may result in higher accuracy.

By way of an example, the ANN may be a binary classifier with a single layer of three neural nodes ({N1, N2, N3}). The input vector ([X1, X2, X3]) may include three values for each of the three neural nodes. Further, the ANN is trained to classify any input data into one of the two classes (e.g. either class A or class B). As will be appreciated, each of the neural nodes may have a value (i.e., weight) by the end of the training. These weights in combination with the input values may decide the classification result. Assuming the ANN may have been trained to have the weights of the three neural nodes as n1, n2, and n3, and the known input vector (in the training data) is [x1, x2, x3]. The function fn(n1.x1+ n2.x2+n3.x3) be used to determine the output value used for classification. If the output (i.e., value of the function fn) is more than a threshold value k (0<k<1) then the input data may be classified as belonging to class A, else it may be classified as belonging to class B.

For each class, the contribution factor for a given neural node from the three neural nodes is determined by setting the weight of the given neural node to 'zero'. Thus, the contribution factor of the neural node N1 may be determine by setting the weight n1=0. The weights (i.e., n2 and n3) of other two neural nodes (i.e., N2 and N3) may adjust to reach the output range for the correct classification. If for the input vector [x1, x2, x3], the ANN with values n1, n2, n3 produced the value k1 which is greater than k (hence, classifying it to class A), then when the value of n1 is set to 0, n2 and n3 may change to n2+v12 and n3+v13. Typically, this change should still lead to an output value greater than k so that the classification result remains unchanged. Similarly, contribution factor may be determined for each of the neural nodes. In other words, the contribution factor for each neural node against each of the remaining neural nodes may be determined. The contribution factors of each neural node may then be used to build the dominance matrix for the ANN. It should be noted that the concept of dominance matrix is based on the dominance graph. For the neural nodes N1, N2, N3, the dominance matrix may be formed as below:

$$\begin{array}{c} \phantom{n1}\; n1 \; n2 \; n3 \\ \begin{array}{c} n1 \\ n2 \\ n3 \end{array} \left[ \begin{array}{ccc} 0 & v_{12} & v_{13} \\ v_{21} & 0 & v_{23} \\ v_{31} & v_{32} & 0 \end{array} \right] \end{array}$$

The dominance factor for each of the neural nodes may be determined from the dominance matrix. For example, in some embodiments, the dominance factor for each neural node may be the sum of all the value in corresponding row of the dominance matrix. Thus, the dominance factor for N1 may be v12+v13. Similarly, the dominance factor for N2 may be v21+v23, and that for N3 may be v32+v31. The neural nodes may then be ranked based on their corresponding dominance factor. In some embodiments, the neural nodes may be ranked according to the corresponding dominance factor in a descending order. Thus, the neural node with the highest dominance factor may have the highest rank, while the neural node with the lowest dominance factor may have the lowest rank. It should be noted that, for each class, there may be a set of probable rank and order of the neural nodes.

By way of further example, upon training the binary classifier with the single layer of three neural nodes ({N1, N2, N3}), the weights of the neural nodes and a known input vector from the training dataset are as follows:

[n1=0.62, n2=0.43, n3=1.26]
Known input vector=[4, 8, 6]

Assuming that the function for the final output is a simple summation function $\Sigma n_i x_i$ and the threshold learnt by the ANN is k=10 (i.e., the value greater than k being classified as positive in Class 'A'). Thus, for the initial neural node weights and the known input vector, the final output will be 13.48 and the classification will be a positive classification for class 'A', as per calculation below:

$$\text{Output} = \sum nixi = n1.\times 1 + n2.\times 2 + n3.\times 3$$

-continued $$= (0.62^*4) + (0.43^*8) + (1.26^*6)$$

$$= 2.48 + 3.44 + 7.56$$

$$= 13.48;$$

Since, Output>k, input data is classified as class 'A'.

As stated above, the contribution factor of each neural node may be determine by setting its weight to 'zero'. The weights remaining neural nodes may adjust to reach the output range for the correct classification. In other words, if weight of one of the neural nodes is set to 'zero', then the weights of other two neural nodes will have to adjust to get the output above threshold k. In this manner, contribution factor of each of the neural nodes may be determined by setting weight of each of the neural nodes to 'zero'. For example, the contribution factor of each of the neural nodes (N1, N2, and N3) is determined as below:

When n1=0, $$\text{Output} = \Sigma nixi = n1x1 + n2x2 + n3x3 = 13.48$$

Even when n1 is set to 0, n2 and n3 values change to compensate for the score 13.48.

Hence, (0*4)+(n2*8)+(n3*6)=13.48

$$8n2+6n3=13.48 \quad (1)$$

Similarly, when n2=0, $$4n1+6n3=13.48 \quad (2)$$

And, when n3=0, $$8n2+6n3=13.48 \quad (3)$$

Upon solving equations (1), (2) and (3), the adjusted values for the three neural nodes are as follows:

n1=1.685
n2=0.8425
n3=1.1233

Further, as stated above, the change in weights of each of the neural nodes may be used to generate the dominance matrix (M) as follows:

$$M = \begin{array}{c} \phantom{n1}\; n1 \phantom{xxxxx} n2 \phantom{xxxxx} n3 \\ \begin{array}{c} n1 \\ n2 \\ n3 \end{array} \left[ \begin{array}{ccc} 0 & (1.685-0.62) & (1.26-1.1233) \\ (1.685-0.62) & 0 & (0.8425-0.43) \\ (1.26-1.1233) & (0.8425-0.43) & 0 \end{array} \right] \end{array}$$

$$M = \begin{array}{c} \phantom{n1}\; n1 \phantom{xx} n2 \phantom{xx} n3 \\ \begin{array}{c} n1 \\ n2 \\ n3 \end{array} \left[ \begin{array}{ccc} 0 & 1.065 & 0.1367 \\ 1.065 & 0 & 0.4125 \\ 0.1367 & 0.4125 & 0 \end{array} \right] \end{array}$$

Further, as stated above, the dominance matrix may be used to obtain the dominance factor of each of the neural nodes. In some embodiments, a modified dominance matrix (M'=M+M$^2$) is determined as follows:

$$M + M^2 = \begin{matrix} & n1 & n2 & n3 \\ n1 & 0 & 1.065 & 0.1367 \\ n2 & 1.065 & 0 & 0.4125 \\ n3 & 0.1367 & 0.4125 & 0 \end{matrix} + \begin{matrix} & n1 & n2 & n3 \\ n1 & 1.1529 & 0.056 & 0.4393 \\ n2 & 0.056 & 1.3043 & 0.1455 \\ n3 & 0.4393 & 0.1455 & 0.1888 \end{matrix}$$

In some embodiments, the dominance factor for each neural node is the sum of each element in corresponding row of the modified dominance matrix (M'). The neural node with the highest dominance factor may have the highest rank. Hence, as per above, the neural node may be ranked in the order [n2, n1, n3]. Similarly, for all the positive classifications, the order and rank may be computed so as to determine a set of valid rank and orders for neural nodes for each of the classes (e.g., [n2, n1, n3] for class 'A', [n3, n1, n2] for class 'B').

During the operational phase, if any of the results is positive for a particular class, the order and rank is determined with respect to the test input vector in a manner similar to that described above. If the order and rank for the test input vector matches the order and rank calculated above for the known input vector, then the classification may be said to be correct (i.e., true positive). However, if the order and rank for the test input vector do not match the order and rank calculated above for the known input vector, then the classification may be said to be incorrect or misclassification (i.e., false positive). For example, assuming that the acceptable order for class A is ([n1, n3, n2]), the prediction output corresponds to class 'A', but the test input vector produces the order [n1, n2, n3]). In such case, though the prediction from the ANN is class A, the rank and order produced by the test input vector does not belong to the acceptable order. The ANN validation engine 200 may, therefore, flag the positive classification performed by the ANN as a 'probable false positive'.

It should be noted that the same procedure may be extrapolated for a multi-layer neural network architecture, each layer having multiple neural nodes, with no or minor modifications. For example, it should be noted that, for a multi-layer ANN, steps 405 and 406 may be repeated for each of the layers separately, and an aggregate validation may be required to determine 'true positive' or 'false positive'.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
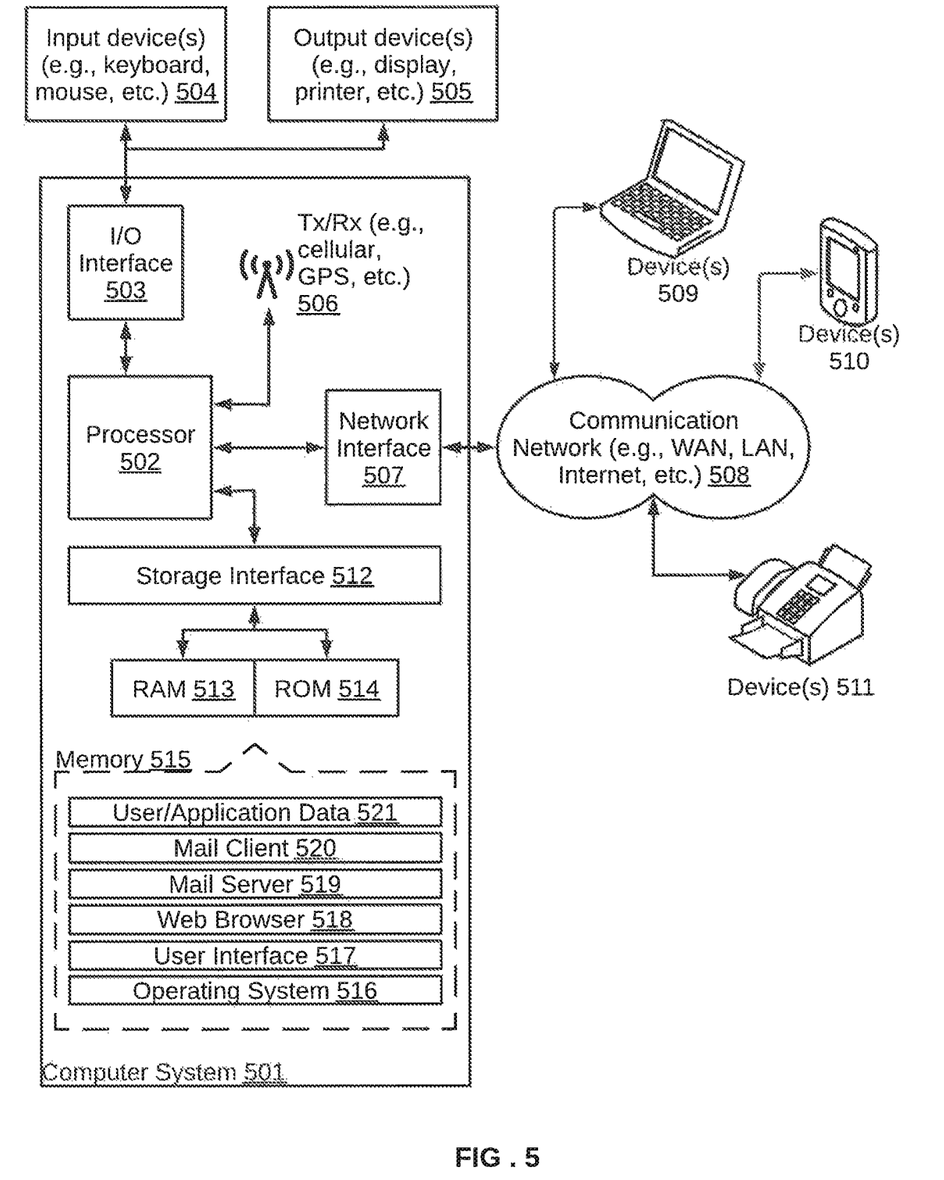
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 for verifying classification performed by an ANN. Computer system 501 may include a central processing unit ("CPU" or "processor") 502. Processor 502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, near field communication (NEC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n /b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., APPLE® (PHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, 12C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® IOS®, MICROSOFT® WINDOWS® (XP®, Vista®/7/8, etc.), APPLE® IOS®, GOOGLE® ANDROID®, BLACKBERRY® OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 501 may implement a web browser 518 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 501 may implement a mail server 519 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 501 may implement a mail client 520 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 501 may store user/application data 521, such as the data, variables, records, etc. (e.g., weight matrix for each layer of the ANN, predefined weight for generating modified weight matrix, modified weight matrix for each neural node of each layer of the ANN, known input vector, contribution factor of each neural node of each layer of the ANN for each class, the dominance matrix for each layer for each class, dominance factor of each neural node of each layer of the ANN for each class, rank of each neural node in each layer for each class, test input vector, and so forth) as described in this disclosure, Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for verification of positive classification performed by the ANN based on rank and order of neural nodes as per their dominance factors in each of the layers of the ANN. The techniques may improve efficiency of the ANN by verifying the false positive, which, in turn, results in lesser error rate. Further, the techniques provide for an understanding of how neural network decisions are made. Such insights may further help in improving the efficiency of the ANN. Moreover, the techniques may be easily deployed in any cloud based servers for access and use as an 'application as a service' by any computing device including mobile device. For example, the ANN validation engine 200 may be implemented on a cloud based server and used for improving performance of various ANN based mobile device applications.

The specification has described method and system for verifying classification performed by an ANN. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of verifying a positive classification performed by an artificial neural network (ANN) in a given class from among a plurality of classes, the method comprising:
for each layer of the ANN, generating, by an ANN validation device, a weight matrix comprising a weight of each neural node in a given layer;
for each neural node in the given layer, determining, by the ANN validation device, a contribution factor of a given neural node in the given layer with respect to an output of the ANN for the given class based on a known input vector to the given layer and a modified weight matrix, wherein the modified weight matrix is derived from the weight matrix by replacing weight of the given neural node in the given layer with a predefined weight;
for the given layer, generating, by the ANN validation device, a dominance matrix based on the contribution factor of each neural node in the given layer, wherein the dominance matrix is used to obtain a dominance factor of each neural node in the given layer;
for the given layer, determining, by the ANN validation device, a rank of each neural node based on the corresponding dominance factor; and
verifying, by the ANN validation device, the positive classification performed by the ANN in the given class for a test input vector based on the rank of each neural node in each layer of the ANN;
wherein the predefined weight in the modified weight matrix is about zero.

2. The method of claim 1, wherein generating the weight matrix comprises building and training the ANN for a target application.

3. The method of claim 1, wherein determining the contribution factor of the given neural node in the given layer comprises:
determining weight adjustment for each remaining neural node in the given layer with the modified weight matrix and the known input vector in order to arrive at the output of the ANN with the original weight matrix and the known input vector; and
determining the contribution factor based on the weight adjustment for each remaining neural node in the given layer.

4. The method of claim 1, wherein the dominance factor of each neural node is obtained by adding value of each element in corresponding row of a modified dominance matrix, wherein the modified dominance matrix is derived from the dominance matrix.

5. The method of claim 3, wherein the verifying comprises:
determining a dominance factor and a rank of each neural node in each layer based on the test input vector; and
for each layer, comparing the rank of each neural node in a given layer for the test input vector with the corresponding rank of each neural node for the known input vector.

6. The method of claim 5, wherein the verifying is further based on the dominance factor of each neural node in each layer, and comprises, for each layer, comparing the dominance factor of each neural node in a given layer for the test input vector with the corresponding dominance factor of each neural node for the known input vector.

7. A system for verifying a positive classification performed by an artificial neural network (ANN) in a given class from among a plurality of classes, the system comprising:
an ANN validation device comprising at least one processor and a computer-readable medium storing instructions that, when executed by the at least one processor, cause the at least one processor to perform operations comprising:
for each layer of the ANN, generating a weight matrix comprising a weight of each neural node in a given layer;
for each neural node in the given layer, determining a contribution factor of a given neural node in the given layer with respect to an output of the ANN for the given class based on a known input vector to the given layer and a modified weight matrix, wherein the modified weight matrix is derived from the weight matrix by replacing weight of the given neural node in the given layer with a predefined weight;

for the given layer, generating a dominance matrix based on the contribution factor of each neural node in the given layer, wherein the dominance, matrix is used to obtain a dominance factor of each neural node in the given layer;

for the given layer, determining a rank of each neural node based on the corresponding dominance factor; and verifying the positive classification performed by the ANN in the given class for a test input vector based on the rank of each neural node in each layer of the ANN;

wherein the predefined weight in the modified weight matrix is about zero.

8. The system of claim 7, wherein generating the weight matrix comprises building and training the ANN for a target application.

9. The system of claim 7, wherein determining the contribution factor of the given neural node in the given layer comprises:

determining weight adjustment for each remaining neural node in the given layer with the modified weight matrix and the known input vector in order to arrive at the output of the ANN with the original weight matrix and the known input vector; and determining the contribution factor based on the weight adjustment for each remaining neural node in the given layer.

10. The system of claim 7, wherein the dominance factor of each neural node is obtained by adding value of each element in corresponding row of a modified dominance matrix, wherein the modified dominance matrix is derived from the dominance matrix.

11. The system of claim 7, wherein the verifying comprises:

determining a dominance factor and a rank of each neural node in each layer based on the test input vector; and for each layer, comparing the rank of each neural node in a given layer for the test input vector with the corresponding rank of each neural node for the known input vector.

12. The system of claim 11, wherein the verifying is further based on the dominance factor of each neural node in each layer, and comprises, for each layer, comparing the dominance factor of each neural node in a given layer for the test input vector with the corresponding dominance factor of each neural node for the known input vector.

13. A non-transitory computer-readable medium storing computer-executable instructions for verifying a positive classification performed by an artificial neural network (ANN) in a given class from among a plurality of classes, the computer-executable instructions configured for:

for each layer of the ANN, generating a weight matrix comprising a weight of each neural node in a given layer;

for each neural node in the given layer, determining a contribution factor of a given neural node in the given layer with respect to an output of the ANN for the given class based on a known input vector to the given layer and a modified weight matrix, wherein the modified weight matrix is derived from the weight matrix by replacing weight of the given neural node in the given layer with a predefined weight;

for the given layer, generating a dominance matrix based on the contribution factor of each neural node in the given layer, wherein the dominance matrix is used to obtain a dominance factor of each neural node in the given layer;

for the given layer, determining a rank of each neural node based on the corresponding dominance factor; and verifying the positive classification performed by the ANN in the given class for a test input vector based on the rank of each neural node in each layer of the ANN;

wherein the predefined weight in the modified weight matrix is about zero.

14. The non-transitory computer-readable medium of claim 13, wherein generating the weight matrix comprises building and training the ANN for a target application.

15. The non-transitory computer-readable medium of claim 13, wherein determining the contribution factor of the given neural node in the given layer comprises:

determining weight adjustment for each remaining neural node in the given layer with the modified weight matrix and the known input vector in order to arrive at the output of the ANN with the original weight matrix and the known input vector; and determining the contribution factor based on the weight adjustment for each remaining neural node in the given layer.

16. The non-transitory computer-readable medium of claim 13, wherein the dominance factor of each neural node is obtained by adding value of each element in corresponding row of a modified dominance matrix, wherein the modified dominance matrix is derived from the dominance matrix.

17. The non-transitory computer-readable medium of claim 13, wherein the verifying comprises:

determining a dominance factor and a rank of each neural node in each layer based on the test input vector; and for each layer, comparing the rank of each neural node in a given layer for the test input vector with the corresponding rank of each neural node for the known input vector.

18. The non-transitory computer-readable medium of claim 17, wherein the verifying is further based on the dominance factor of each neural node in each layer, and comprises, for each layer, comparing the dominance factor of each neural node in a given layer for the test input vector with the corresponding dominance factor of each neural node for the known input vector.

* * * * *